United States Patent
Hayama et al.

[11] Patent Number: 5,936,339
[45] Date of Patent: Aug. 10, 1999

[54] COLOR IMAGE RECEIVING TUBE WITH PIGMENT-COATED PHOSPHOR PARTICLES

[75] Inventors: Hidekazu Hayama, Osaka; Toshihide Takahashi, Kyoto; Masao Gotoh, Hyogo; Naoyuki Tani, Osaka, all of Japan

[73] Assignee: Matsushita Electronics Corporation, Osaka, Japan

[21] Appl. No.: 08/839,167

[22] Filed: Apr. 22, 1997

[30] Foreign Application Priority Data

Oct. 8, 1996 [JP] Japan ..................... 8-266927

[51] Int. Cl.⁶ .................. H01J 29/10; H01J 31/00
[52] U.S. Cl. ................ 313/461; 313/467; 313/469; 313/473; 313/477 R
[58] Field of Search .................. 313/461, 474, 313/466–69, 478, 479, 480, 473, 477 R; 428/403, 404; 427/218, 219

[56] References Cited

U.S. PATENT DOCUMENTS

| 4,020,231 | 4/1977 | Hedler et al. | 428/403 |
| 4,307,320 | 12/1981 | Kotera et al. | 313/474 |
| 4,309,481 | 1/1982 | Wakatsuki et al. | 428/403 |
| 4,339,501 | 7/1982 | Inoue et al. | 428/404 |
| 4,392,077 | 7/1983 | Libman | 313/474 |
| 5,369,331 | 11/1994 | Mizukami et al. | 313/467 |
| 5,394,055 | 2/1995 | Tono et al. | 313/467 |

FOREIGN PATENT DOCUMENTS

| 52-14587 | 4/1977 | Japan . |
| 52-14588 | 4/1977 | Japan . |
| 52-14589 | 4/1977 | Japan . |
| 53-4463 | 1/1978 | Japan . |
| 53-53958 | 5/1978 | Japan . |
| 58-164677 | 9/1983 | Japan . |
| 2-38483 | 2/1990 | Japan . |
| 6-275209 | 9/1994 | Japan . |

OTHER PUBLICATIONS

"Verbesserte Bildquälitat" *Radio Fernsehen Elektronik,* vol. 45, No. 9, pp. 32–34 (English translation of p. 32).

Hayama et al. "Crystal Pigment Screen for Wide CRTs" *National Technical Report,* vol. 42, No. 3, pp. 101–107 (Abstract).

Carl et al. "The Pigmentation of Phosphors for Colour Television" *Philips Technical Review,* vol. 40, no. 2–3, pp. 48–53.

Trond "Filter Phosphors" *SID International Symposium,* Digest of technical Papers, pp. 170–171.

Communication from European Patent Office and attached Search Report.

*Primary Examiner*—Sandra O'Shea
*Assistant Examiner*—Mack Haynes
*Attorney, Agent, or Firm*—Merchant, Gould, Smith, Edell, Welter & Schmidt P.A.

[57] ABSTRACT

A color image receiving tube comprising three color (red, green and blue) phosphor screens on an inner surface of a face-plate; wherein at least two of said three color phosphor screens are coated with pigments; and wherein said three color phosphor screens have a total reflective brightness less than 70% that of three color phosphor screens with no pigment coating. According to the above-mentioned constitution, a color image receiving tube having a higher emisson brightness and contrast is achieved as compared to a color image receiving tube having the same reflective brightness, where the reflective brightness is obtained by lowering the light transmittance of its face-plate.

6 Claims, 9 Drawing Sheets

COLOR IMAGE RECEIVING TUBE WITH PIGMENT-COATED PHOSPHOR PARTICLES

FIELD OF THE INVENTION

The present invention relates to a color image receiving tube which can reduce the reflection of outside light on phosphor screens and can provide picture images of high contrast.

BACKGROUND OF THE INVENTION

Color image receiving tubes with clear and high contrast picture images have been requested. However, the reflectance of the phosphor screens of image receiving tubes is almost 100%, and a non-luminescent section of the screen becomes white instead of black when outside light such as sunlight or incandescent light hits the screen, thus reducing picture image contrast. Thus, in order to improve picture image contrast, a face-plate with low light transmittance is applied to a color image receiving tube, or a colored film is coated on the outside surface of a face-plate. Contrast is improved if outside light reflected by a phosphor screen is absorbed by the face-plate or the colored film.

Also, in Laid-open (Kokai) Japanese Patent Application No. Hei 6-275209, the reflective brightness of a phosphor screen is reduced by coating a small amount of a pigment on the phosphor screen while maintaining the emission brightness (luminance) of the screen as much as possible. Examples of reducing the reflective brightness of a phosphor screen are disclosed in Kokoku Japanese Patent Applications No. Sho 52-14587, No. Sho 52-14588 and No. Sho 52-14589. In one example, pigment layers are placed between a face-plate and three color phosphor screens so as to match the color of each pigment layer to the color of each phosphor screen. In this case, incident light components having different colors from the colors of the phosphor screens are absorbed by the pigment layers, and the absorption of phosphor screen emission is also minimized. Thus, by setting the light transmittance of the face-plate high, contrast is enhanced without reducing the emission brightness of picture images.

The above-described conventional methods, however, have the following problems.

(1) In the method of applying a face-plate with low light transmittance or coating a colored screen on a face-plate, outside light reflected by a phosphor screen is absorbed by the face-plate or the colored screen, thus providing black picture images. However, even at a luminescent section of the phosphor screen, emission from the screen is absorbed by the face-plate or the colored screen, thereby reducing the emission brightness of picture images.

(2) In the method of coating a small amount of a pigment on a phosphor screen while maintaining the emission brightness of the phosphor screen, the reflective brightness of the pigment coated phosphor is about 75% of that of the phosphor with no pigment coating, and this is high. Thus, in order to increase contrast, a face-plate with low light transmittance or a colored screen has to be also applied. As a result, the emission brightness of picture images declines.

(3) In the method of locating pigment layers between a face-plate and three color phosphor screens, the processes of manufacturing the pigment layers are so complex that the cost of producing color image receiving tubes increases.

SUMMARY OF THE INVENTION

In order to solve the conventional problems mentioned above, the present invention aims to provide a color image receiving tube at low cost which can bring picture images of high emission brightness (luminance) and contrast by reducing the reflective brightness of outside light on phosphor screens.

The color image receiving tube of the present invention comprises three color (red, green and blue) phosphor screens on the inner surface of a face-plate. At least two of the three color phosphors are coated with a pigment. Thus, the reflective brightness of the three color phosphor screens is less than 70% of that of three color phosphor screens with no pigment coating.

It is preferable that the three color phosphor screens are all coated with pigments. It is also preferable that the red color phosphor coated with a red pigment has a reflective brightness less than 60% that of a red color phosphor with no red pigment coating, and has more than 70% reflectance with 620 nm wavelength light; it is preferable that the green color phosphor coated with a green pigment has a reflective brightness of less than 75% that of a green color phosphor with no green pigment coating, and has more than 80% reflectance with 530 nm wavelength light; and it is preferable that the blue color phosphor coated with a blue pigment has a reflective brightness of less than 60% that of a blue color phosphor with no blue pigment coating, and has more than 70% reflectance with 450 nm wavelength light. Therefore, the color image receiving tube of the present invention can provide higher emission brightness and contrast than a conventional color image receiving tube which has the same reflective brightness simply by reducing the light transmittance of its face-plate as the color image receiving tube of the invention. Also, since pigments are coated directly on the phosphors in this invention, the complex processes of forming pigment layers become unnecessary. In other words, the cost of manufacturing the color image receiving tube of the present invention is low.

It is also preferable in this present invention that the red color phosphor is coated with a red pigment at 0.12 wt. % or above coating concentration, that a green color phosphor is coated with a green pigment at 0.5 wt. % or above coating concentration, and that the blue color phosphor is coated with a blue pigment at a 2.0 wt. % or above coating concentration.

It is preferable that the red color phosphor is coated with at least one pigment selected from the group consisting of iron oxide red, cadmium red and chrome vermilion.

It is also preferable that the green color phosphor is coated with at least one pigment selected from the group consisting of spinel green and cobalt chromite.

It is further preferable that the blue color phosphor is coated with at least one pigment selected from the group consisting of cobalt blue, ultramarine blue and cerulean blue.

DETAILED DESCRIPTION OF THE INVENTION

The color image receiving tube of the present invention will be explained in further detail by referring to the drawings.

Figure 1:
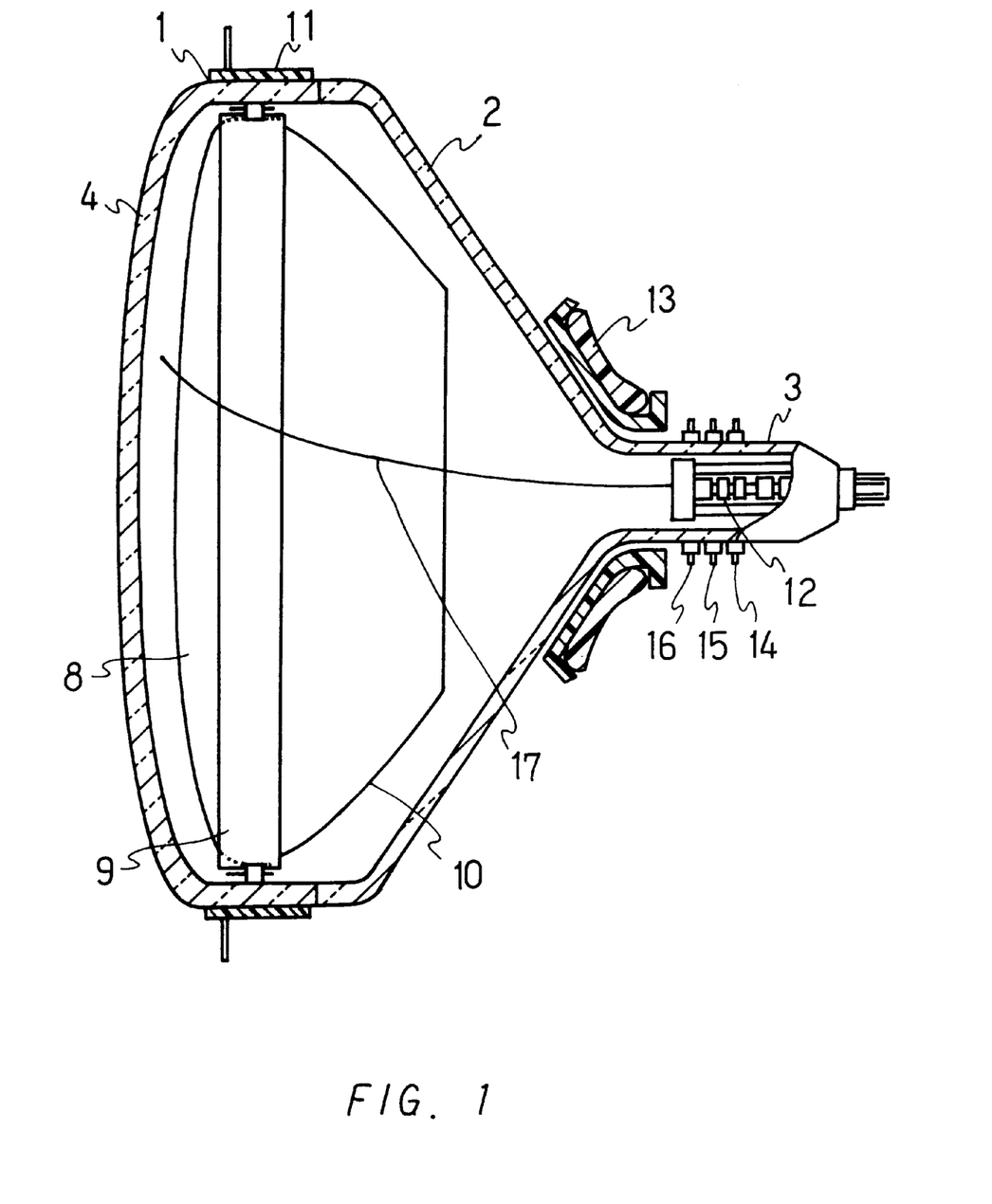
FIG. 1 is a cross-sectional view of a color image receiving tube of one embodiment of the present invention.

FIG. 1 is a color image receiving tube of one embodiment of the present invention. In the figure, the color image receiving tube comprises a panel section 1 positioned at the front side of the image receiving tube, a neck section 3 housing an electron gun 12, and a funnel section 2 positioned between panel section 1 and neck section 3. Panel section 1 comprises a glass face-plate 4 in the front section. A graphite layer and phosphor screens are formed on the inner surface of the face-plate (not shown in FIG. 1).

To the inside wall of panel section 1, a mask frame 9 is fixed. A shadow mask 8 is fixed to mask frame 9, facing the phosphor screens. In order to prevent implosion, the outside wall of the panel section is tightened with a reinforcing band 11. To the outside of a joint between funnel section 2 and neck section 3, a deflection yoke 13 is applied. At the outside of neck section 3, a purity control magnet 14, a center beam static convergence control magnet 15, and a side beam static convergence control magnet 16 are positioned in parallel to each other. Three electron beams 17 (only one beam is shown in the figure) are irradiated from electron gun 12, and are deflected in a predetermined direction by deflection yoke 13. Then, the beams reach the phosphor screens after passing through shadow mask 8.

The color image receiving tube mentioned above has the same structure as conventional color image receiving tubes, except for the phosphor screens formed on the inner surface of the face-plate. Thus, the structure and operation of the color image receiving tube of the present invention are not described in detail hereinafter.

EXAMPLE 1

Figure 2A:
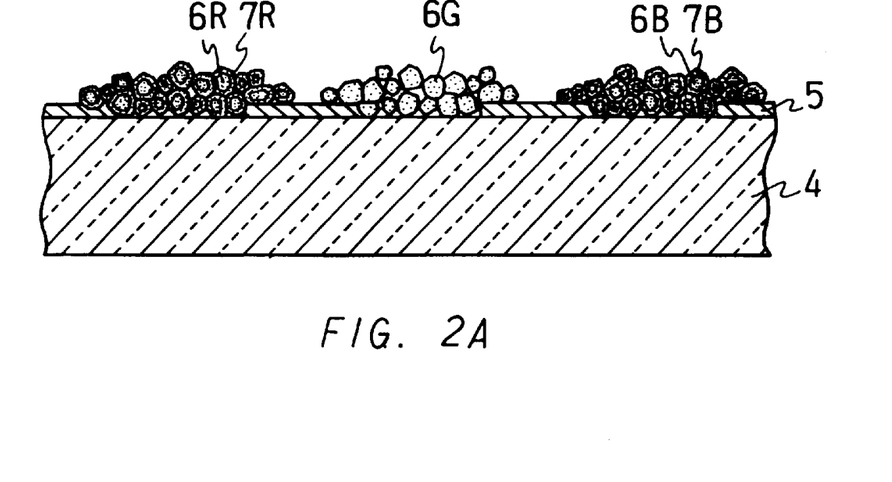
FIGS. 2A and B are cross-sectional views of the face-plate shown in FIG. 1.

The color image receiving tube of this embodiment will be explained below. A red color phosphor and a blue color phosphor are coated with a red pigment and a blue pigment respectively. FIG. 2A is a cross-sectional view of the face-plate shown in FIG. 1.

In FIG. 2A, 6R is a red color phosphor particle; 6G is a green color phosphor particle; and 6B is a blue color phosphor particle. The three color phosphor particles are applied on the inner surface of face-plate 4, thus forming three color phosphor screens. A striped graphite film 5 known as a black matrix is also formed on the inner surface of face-plate 4 between the phosphor screens. Graphite screen 5 may also be formed in a dotted pattern.

On a red color phosphor particle 6R, an iron oxide red ($Fe_2O_3$) pigment layer 7R is coated, and cobalt blue ($CoO.Al_2O_3$) pigment layer 7B is coated on blue phosphor particle 6B. These pigment coated phosphor film can be formed by a conventional method such as a flow coat method.

In FIG. 2A, phosphor particles are completely covered with pigments for the sake of convenience. However, in reality, phosphor particles may be only partially coated with pigment particles as shown in FIG. 2C. This applies to all three color phosphors.

Figure 3:
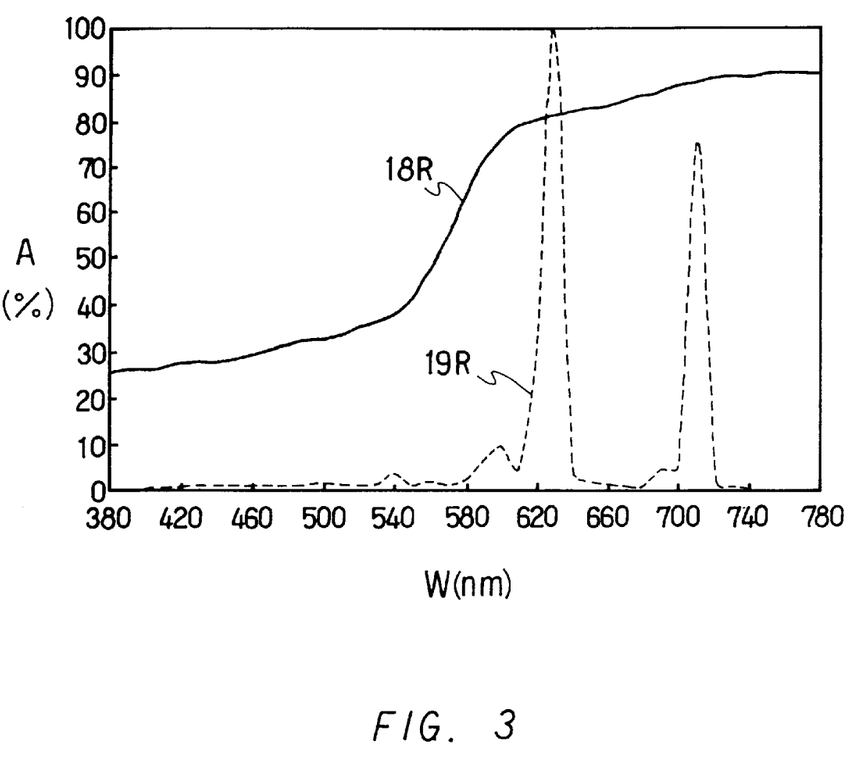
FIG. 3 shows the emission and reflectance spectrum curves of red color phosphor screens of one embodiment of the present invention.

FIG. 3 shows the reflectance spectrum curve of a red pigment coated phosphor of one embodiment. In the figure, 18R is the reflectance spectrum curve of a red color phosphor ($Y_2O_2S:Eu$) coated with iron oxide red particles (red pigment) at 0.3 wt. %; 19R is the emission spectrum curve of the red color phosphor with no pigment coating.

Figure 4:
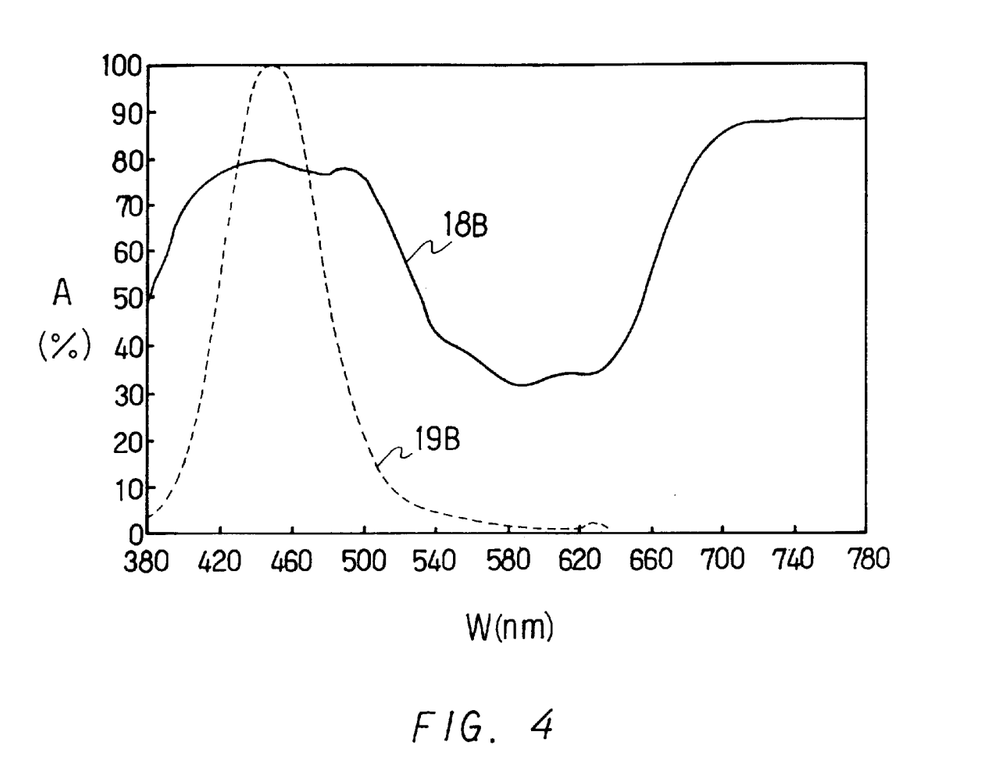
FIG. 4 shows the emission and reflectance spectrum curves of blue color phosphor screens of one embodiment of the present invention.

FIG. 4 shows the reflectance spectrum curve of a blue color phosphor coated with a blue pigment. In the figure, 18B is the reflectance spectrum curve of a blue color phosphor (consisting of ZnS:Ag,Al) coated with cobalt blue (pigment) at 5.0 wt. %; and 19B is the emission spectrum curve of the blue color phosphor with no pigment coating. In FIGS. 3 and 4, the horizontal axis (W) indicates wavelength while the vertical axis (A) indicates brightness. The brightness (A) of curves 18R and 18B is a relative value to the reflectance (as 100) of the phosphor with no pigment coating. The brightness (A) of curves 19R and 19B is a relative value to the peak (as 100) of the emission spectrum.

As shown in FIG. 3, the red pigment coated phosphor has a high reflectance around 620 nm wavelength, which is in the emission range of a red color phosphor, and has a low reflectance around 450 nm wavelength, which is in the emission range of a blue color phosphor. In FIG. 4, the blue pigment coated phosphor has a high reflectance at 450 nm wavelength, which is in the emission range of a blue color phosphor, and has a low reflectance around 620 nm wavelength, which is in the emission range of a red color phosphor.

Figure 6:
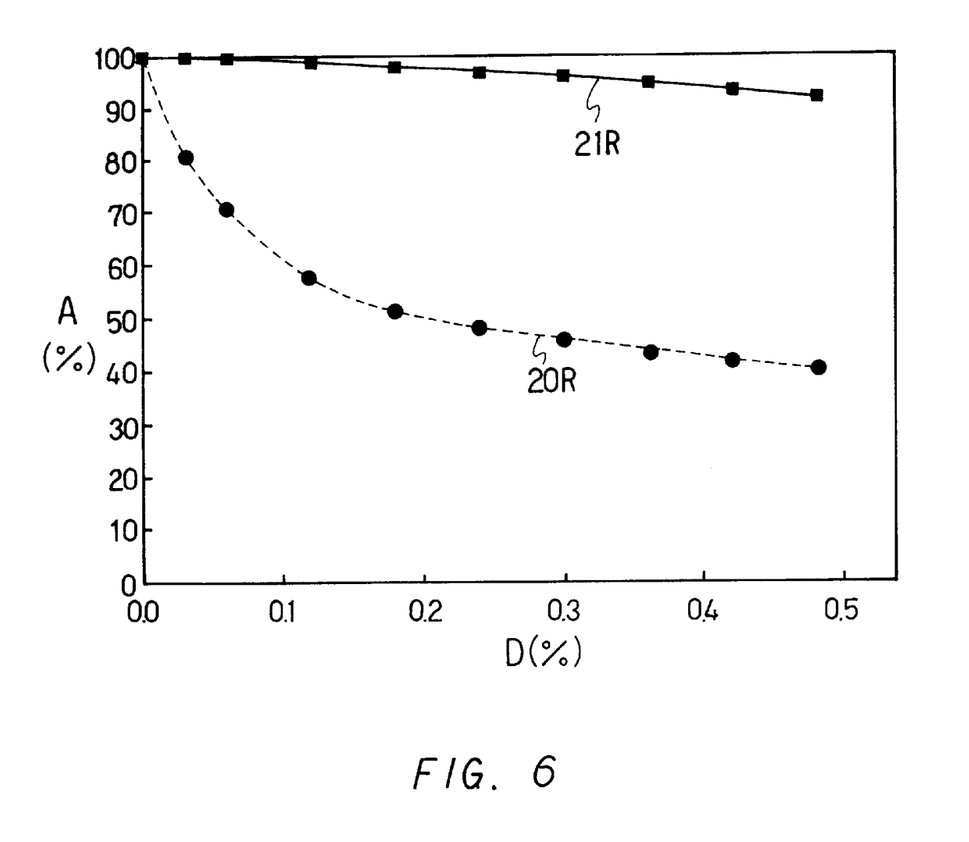
FIG. 6 shows a correlation between red pigment coating concentration and the emission and reflective brightness of red color phosphors of color image receiving tubes of one embodiment of the present invention.

FIG. 6 shows a correlation between red pigment (iron oxide red) coating concentration and the emission and reflective brightness of a red color phosphor coated with the red pigment. In this case, a color image receiving tube comprises only the red color phosphor screen. In the figure, 21R shows the changes in emission brightness of the red color phosphor screen due to the change in the pigment coating concentration; and 20R shows the changes in reflective brightness of the red color phosphor screen due to the change in the pigment coating concentration.

Figure 7:
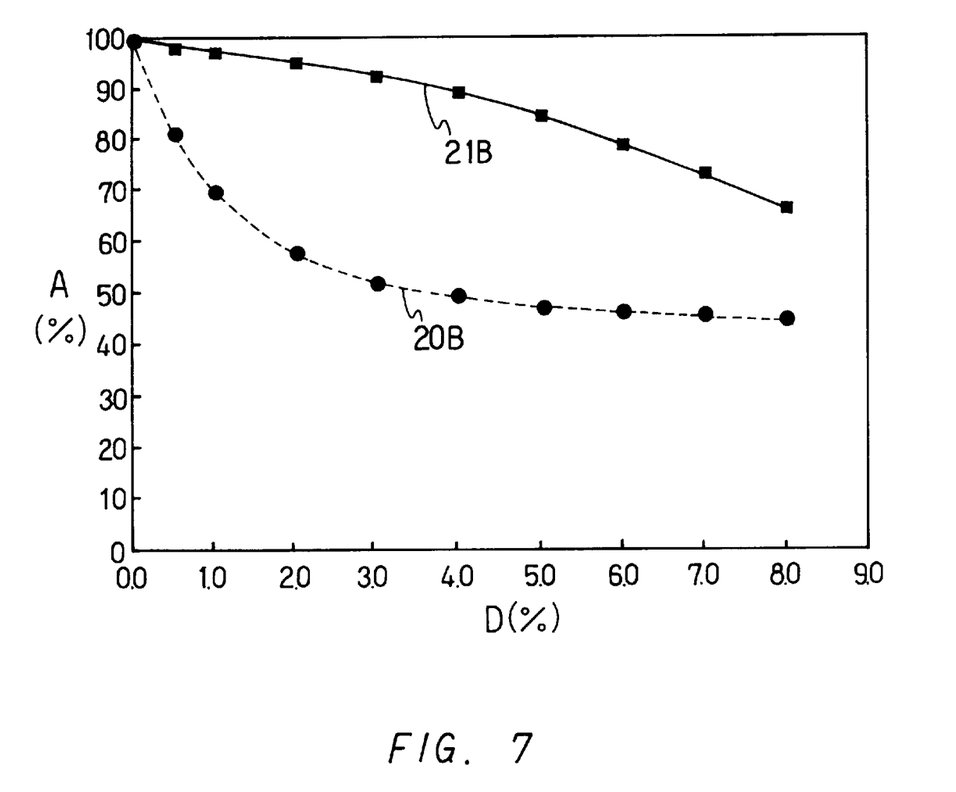
FIG. 7 shows a correlation between blue pigment coating concentration and the emission and reflective brightness of blue color phosphors of color image receiving tubes of one embodiment of the present invention.

FIG. 7 shows a correlation between blue pigment (cobalt blue) coating concentration and the emission and reflective brightness of a blue color phosphor coated with the blue pigment. In this case, a color image receiving tube comprises only the blue color phosphor screen. In the figure, 21B shows the changes in emission brightness of the blue color phosphor screen due to the change in the pigment coating concentration; and 20B shows the changes in reflective brightness of the blue color phosphor screen due to the change in the pigment coating concentration.

In FIGS. 6 and 7, the horizontal axis (D) indicates pigment coating concentration (in wt. %). The vertical axis (A) indicates relative brightness. The emission brightness of the phosphor screen in the figures is a relative value to the respective color emission brightness (as 100) of a red or blue color phosphor screen with no pigment coating; at the same time, the reflective brightness of the phosphor screen is a relative value to the respective color reflective brightness (as 100) of a red or blue color phosphor screen with no pigment coating.

The color image receiving tube preferably has an achromatic (gray) surface. Thus, color image receiving tubes are manufactured in which the reflective brightness of the red phosphor screen is almost equal to that of the blue phosphor screen. Ten types of the color image receiving tube (Test No. 1-1 to Test No. 1-10 shown in the following Table 1) were prepared. The pigment coating concentration was sequentially increased for the red and blue phosphors, and no pigment was coated on the green phosphor.

TABLE 1

| Test No. | Red Phosphor * | Red Phosphor ** | Green Phosphor * | Green Phosphor ** | Blue Phosphor * | Blue Phosphor ** | A ** |
|---|---|---|---|---|---|---|---|
| 1-1 | 0.0 | 100 | 0.0 | 90 | 0.0 | 100 | 96.7 |
| 1-2 | 0.03 | 81 | 0.0 | 90 | 0.5 | 82 | 84.3 |
| 1-3 | 0.06 | 70 | 0.0 | 90 | 1.0 | 70 | 76.7 |
| 1-4 | 0.12 | 57 | 0.0 | 90 | 2.0 | 58 | 68.3 |
| 1-5 | 0.18 | 51 | 0.0 | 90 | 3.0 | 52 | 64.3 |
| 1-6 | 0.24 | 48 | 0.0 | 90 | 4.0 | 49 | 62.3 |
| 1-7 | 0.30 | 46 | 0.0 | 90 | 5.0 | 47 | 61.0 |
| 1-8 | 0.36 | 44 | 0.0 | 90 | 6.0 | 46 | 60.0 |
| 1-9 | 0.42 | 42 | 0.0 | 90 | 7.0 | 45 | 59.0 |
| 1-10 | 0.48 | 40 | 0.0 | 90 | 8.0 | 44 | 58.0 |

\* Pigment coating concentration (%)
\*\* Reflective brightness (%)
A Three color phosphors The pigment coating concentration of each color phosphor in Table 1 is based on the correlation between the pigment coating concentration and the reflective brightness shown in FIGS. 6 and 7. The units of the pigment coating concentration and the reflective brightness in Table 1 are the same as those in FIGS. 6 and 7. The reflective brightness (90%) of the green color phosphor in the table is a relative value to the reflective brightness (as 100%) of the red and blue color phosphors. The furthest right column in Table 1 shows the reflective brightness of three color phosphors, which is the average reflective brightness of the three color phosphors.

Figure 8:
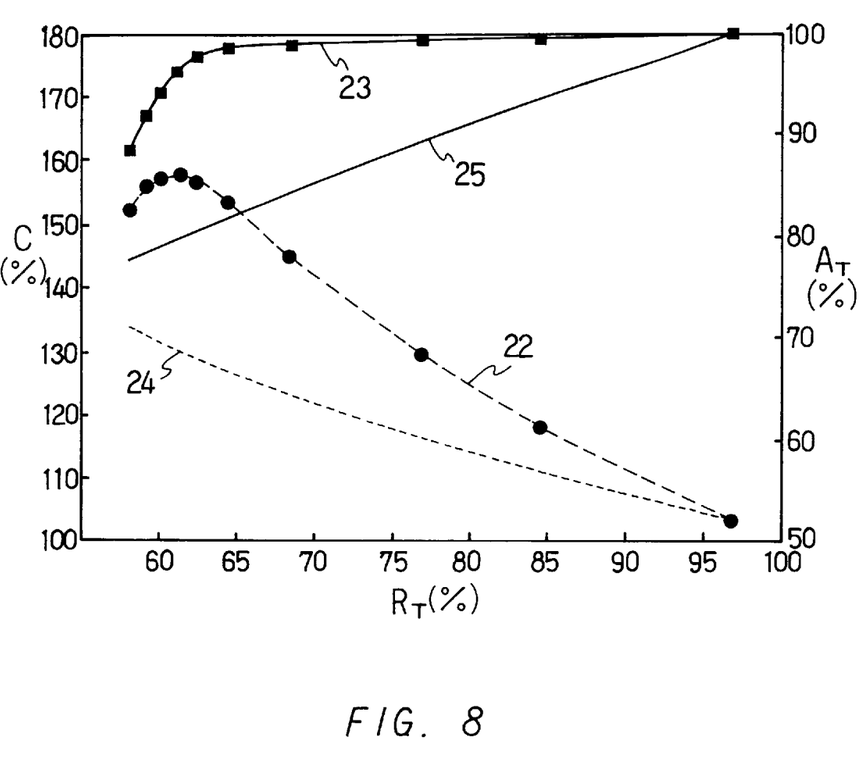
FIG. 8 shows a correlation between pigment coating concentration and the emission and reflective brightness of color phosphor screens of color image receiving tubes of one embodiment table 1 of the present invention.

FIG. 8 shows a correlation between the reflective brightness of Table 1 and white color emission brightness, and between the reflective brightness and contrast. The horizontal axis (RT) indicates the reflective brightness of phosphor screens, which is shown in the furthest right column of Table 1 (average reflective brightness of the three color phosphor screens). The left vertical axis (C) indicates contrast while the right vertical axis (AT) indicates the white color emission brightness (white with 9600 K color temperature).

In FIG. 8, 22 is a contrast curve in relation to the changes in reflective brightness of the pigment coated phosphor screens; and 23 is a white color emission brightness curve in relation to the reflective brightness of the pigment coated phosphor screens. Curves 24 and 25 are shown for the sake of comparison with curves 22 and 23. Curve 24 shows a correlation between the reflective brightness and contrast of three color phosphors with no pigment coating. The light transmittance of the face-plate in curve 24 is smaller than in curve 22. Curve 25 shows a correlation between the reflective brightness and white color emission brightness of the three color phosphors with no pigment coating. The light transmittance of the face-plate in curve 25 is smaller than in curve 23.

The emission brightness and contrast of phosphor screens mentioned above are explained below. The correlation between the emission brightness (AT), observed through a face-plate with a light transmittance (T), and the emission brightness (A0) of phosphor screens is expressed as in the following Formula 1. The following formula is found since light transmits once through the face-plate.

$$AT = A0 \times T \qquad \text{(Formula 1)}$$

The correlation between the reflective brightness (RT), observed through a face-plate with a light transmittance (T), and the reflective brightness (R0) of phosphor screens is expressed as in the following Formula 2. The following formula is found since light transmits twice through the face-plate.

$$RT = R0 \times T^2 \qquad \text{(Formula 2)}$$

Contrast (C) (in %), observed through a face-plate with a light transmittance (T), is defined by a ratio between the emission brightness observed through the face-plate and the reflective brightness observed through the face-plate, so that it can be expressed as in the following Formula 3 by referring to Formulas 1 and 2.

$$C = (A_T / R_T) \times 100 \qquad \text{(Formula 3)}$$
$$= [A_0 \times T / (R_0 \times T^2)] \times 100$$

The values on the left vertical axis in FIG. 8 are calculated from Formula 3.

In FIG. 8, the effects of the light transmittance of a face-plate are compared with those of pigment coating. In other words, the light transmittance of a face-plate is 100% in curves 22 and 23 while the light transmittance is reduced in curves 24 and 25. The right vertical axis (AT) shown in FIG. 8 indicates relative values to the white color emission brightness (as 100) of a color image receiving tube comprising three color phosphor screens with no pigment coating.

According to curve 23 (of pigment coated phosphors) shown in FIG. 8, emission brightness (AT) declines when reflective brightness (RT) is below 70%. However, compared with curve 25 (of color phosphors with no pigment coating) where the reflective brightness of the phosphors is reduced by lowering the light transmittance of the face-plate, curve 23 has a higher emission brightness (AT) at the same level of reflective brightness. In other words, pigment coated phosphors have higher emission brightness (AT) than phosphors with no pigment coating at the same reflective brightness level. This characteristic is also found when reflective brightness (RT) is above 70%. However, the difference in emission brightness (AT) between curve 23 and curve 25 becomes small as reflective brightness (RT) increases.

The above-described characteristics are also found in case of contrast. Curve 22 (of pigment coated phosphor screens) can keep high contrast when reflection brightness (RT) is less than 70%. Also, the contrast in curve 22 is higher than in curve 24 (of phosphor screens with no pigment coating) at the same level of reflective brightness.

Therefore, a color image receiving tube, which comprises pigment coated phosphor screens and has a reflective brightness below 70%, has a higher white color brightness and contrast than a color image receiving tube comprising phosphor screens with no pigment coating and having the same reflective brightness, by lowering the light transmittance of its face-plate.

EXAMPLE 2

A color image receiving tube of a second embodiment of the present invention is explained hereinafter. In this example, a pigment having the same color as the phosphor was coated on all three color (red, green and blue) phosphor screens.

Figure 2B:
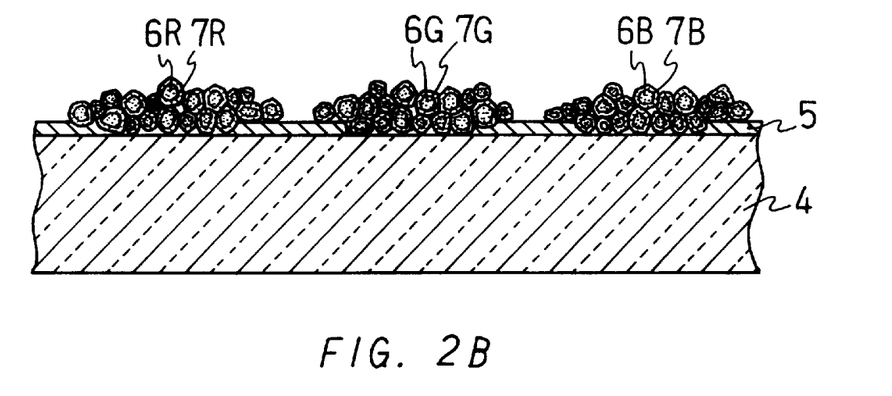
Figure 2C:
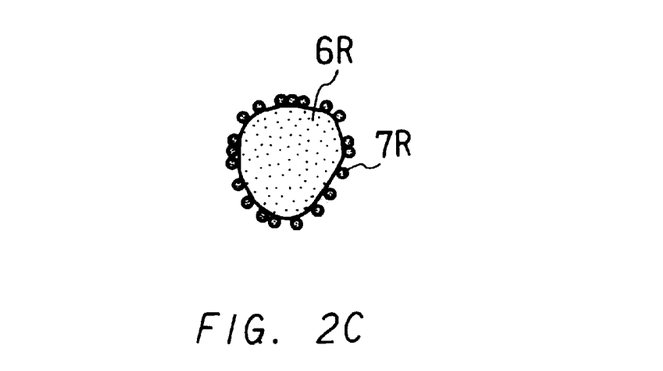
FIG. 2C is a cross-sectional view of a pigment coated phosphor of the embodiment of the present invention.

FIG. 2B shows a part of the cross-section of face-plate 4. This example is the same as in Example 1, except that the green color phosphor particles were also coated with a pigment layer 7G of spinel green pigment ($[(Co,Ni,Zn)_2TiO_4]$) fine particles.

Figure 5:
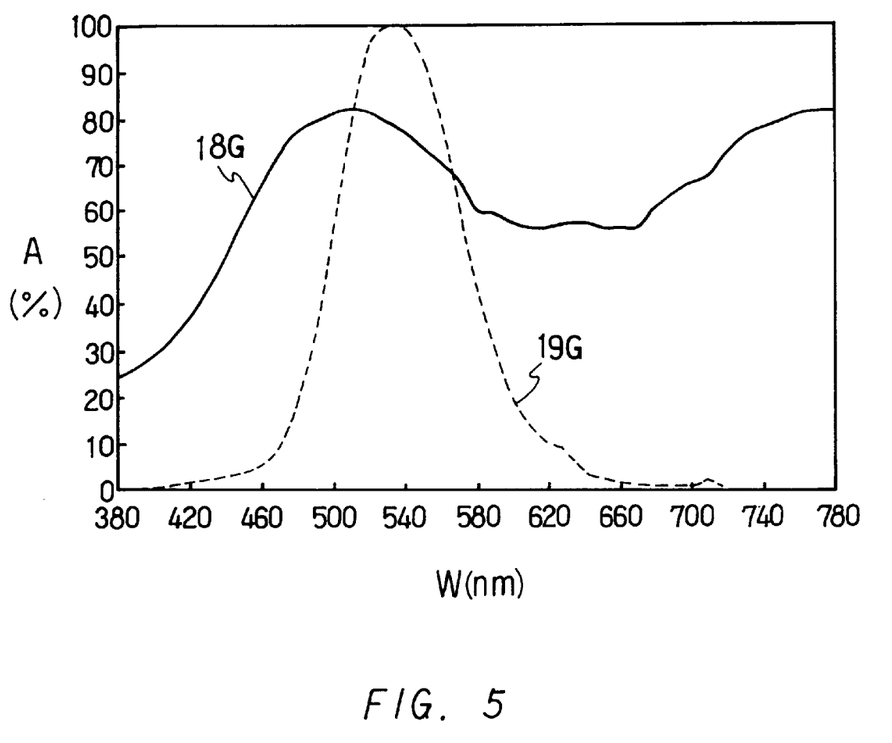
FIG. 5 shows the emission and reflectance spectrum curves of green color phosphor screens of one embodiment of the present invention.

FIG. 5 is the reflectance spectrum curve of a pigment coated green color phosphor screen of one embodiment. In the figure, 18G is the reflectance spectrum curve of a green color phosphor screen (made of ZnS:Cu,Au,Al) coated with the spinel green pigment ($[(Co,Ni,Zn)_2TiO_4]$) fine particles at 0.5 wt. %; in comparison, 19G is the emission spectrum curve of the green phosphor screen with no pigment coating. As in FIGS. 3 and 4, the horizontal axis (W) and the vertical axis (A) indicate wavelength and brightness respectively.

Ten types of the color image receiving tubes, in which the pigment coated green color phosphor of FIG. 5 is applied, (Test No. 2-1 to Test No. 2-10 shown in the following Table 2) were prepared. Test No. 2-1 is the same as Test No. 1-1 where no pigment was coated on the green phosphor screen.

TABLE 2

| Test No. | Red Phosphor | | Green Phosphor | | Blue Phosphor | | A |
|---|---|---|---|---|---|---|---|
| | * | ** | * | ** | * | ** | ** |
| 2-1 | 0.0 | 100 | 0.0 | 90 | 0.0 | 100 | 96.7 |
| 2-2 | 0.03 | 81 | 0.5 | 75 | 0.5 | 82 | 79.3 |
| 2-3 | 0.06 | 70 | 0.5 | 75 | 1.0 | 70 | 71.7 |
| 2-4 | 0.12 | 57 | 0.5 | 75 | 2.0 | 58 | 63.3 |
| 2-5 | 0.18 | 51 | 0.5 | 75 | 3.0 | 52 | 59.3 |
| 2-6 | 0.24 | 48 | 0.5 | 75 | 4.0 | 49 | 57.3 |
| 2-7 | 0.30 | 46 | 0.5 | 75 | 5.0 | 47 | 56.0 |
| 2-8 | 0.36 | 44 | 0.5 | 75 | 6.0 | 46 | 55.0 |
| 2-9 | 0.42 | 42 | 0.5 | 75 | 7.0 | 45 | 54.0 |
| 2-10 | 0.48 | 40 | 0.5 | 75 | 8.0 | 44 | 53.0 |

* Pigment coating concentration (%)
** Reflective brightness of a phosphor screen (%)
A Three color phosphors Test No. 2-2 to Test No. 2-10 were the same as Test No. 1-2 to Test No. 2-10 respectively, except that the green phosphor screen was coated with the green pigment at 0.5 wt. %. As in Table 1, the reflective brightness of the green color phosphor screen is a relative value to the reflective brightness (as 100%) of the red and blue phosphor screens. The furthest right column on Table 2 shows the reflective brightness of all three color phosphor screens which is the average reflective brightness of the color phosphor screens.

Figure 9:
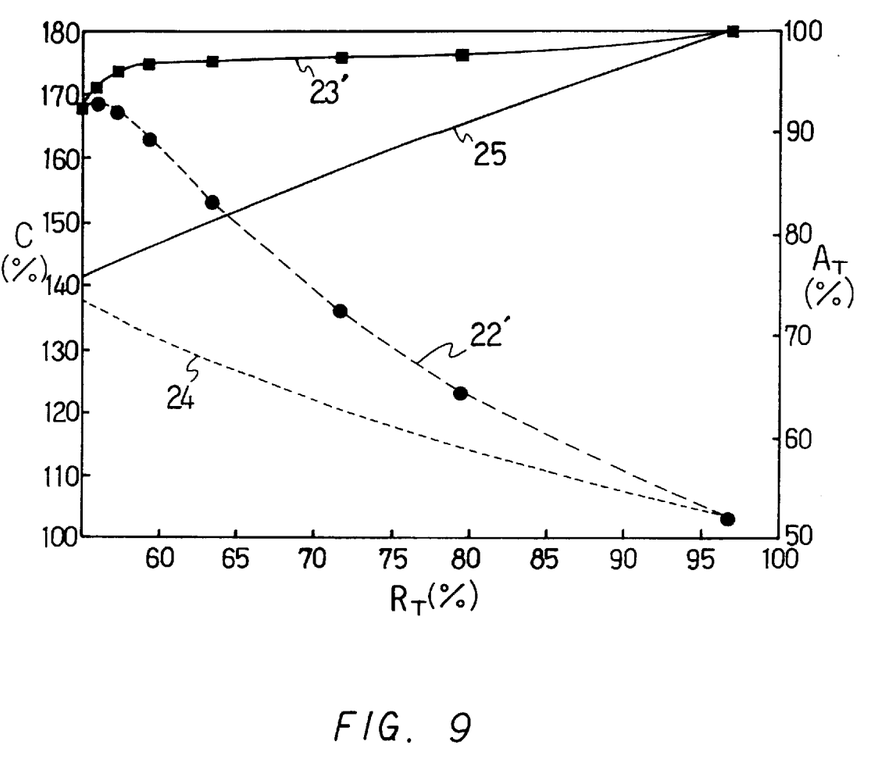
FIG. 9 shows a correlation between pigment coating concentration and the emission and reflective brightness of color phosphor screens of color image receiving tubes of another embodiment table 2 of the present invention.

FIG. 9 shows a correlation between the reflective brightness of phosphor screens and white color emission brightness, and between the reflective brightness and contrast of Table 2. The vertical axis (RT) indicates the reflective brightness of phosphor screens, which is indicated in the furthest right column of Table 2. As in FIG. 8, the left vertical axis (C) indicates contrast while the right vertical axis (AT) indicates white color emission brightness.

In FIG. 9, 22' is a contrast curve in relation to changes in the reflective brightness of phosphor screens; 23' is a white color emission curve in relation to changes in the reflective brightness of the phosphor screens. As in FIG. 8, curves 24 and 25 are shown in FIG. 9 for comparison with curves 22' and 23'. Curves 24 and 25 in FIG. 9 are the same as those in FIG. 8.

As in FIG. 8, color image receiving tubes comprising pigment coated phosphor screens and having a reflective brightness below 70%, can provide more white color brightness and contrast at the same reflective brightness than the ones comprising phosphor screens with no pigment coating and a face-plate with lower light transmittance. Furthermore, the color image receiving tubes of Example 2 have better contrast than the ones in Example 1.

The following Table 3 compares and contrasts Test No. 1-7 (mentioned as Sample 1 in this table), Test No. 2-7 (mentioned as Sample 2 in this table), a conventional phosphor screen to which only a small amount of pigment was coated (mentioned as Conventional Example in this table) and Test No. 1-1 where no pigments were coated on phosphor screens (mentioned as Sample 3).

TABLE 3

| | * | ** | *** |
|---|---|---|---|
| Sample 3 | 96.7 | 30.0 | 100.0 |
| Conventional Example | 70.0 | 41.0 | 135.1 |
| Sample 1 | 61.0 | 45.7 | 146.7 |
| Sample 2 | 56.0 | 48.8 | 153.4 |

* Reflective brightness (%)
** Face-plate light transmittance (%)
*** White color emission brightness (%)

According to Table 3, the reflective brightness of phosphor screens is lower in Samples 1 and 2 than that in the Conventional Example and Sample 3. Compared with the Conventional Example and Sample 3, Samples 1 and 2 can have better white color emission brightness since face-plate light transmittance can be set higher.

In Sample 2, tinted-glass having 48.8% light transmittance was used for the face-plate. For other samples, the light transmittance of a face-plate was controlled by coating a tinted-glass, having 48.8% light transmittance, or dark tinted-glass, having 36.7% light transmittance, with black color.

In Examples 1 and 2, iron oxide red was applied as a red color pigment, but cadmium red (CdS . CdSe) or chrome vermilion ($PbCrO_4$. $PbMoO_4$. $PbSO_4$) may be used instead. As a green color pigment, spinel green $[(Co,Ni,Zn)_2TiO_4]$ was used in the examples, but cobalt chromite $[Co(Cr,Al)_2O_4]$ may be applied instead. Instead of cobalt blue, ultramarine blue ($Na_6Al_6Si_6O_{24}S_4$) or cerulean blue $[2(Co,Mg)O . SnO_2]$ may be applied in the invention.

If a higher contrast is sought in Examples 1 and 2 by further reducing the reflective brightness of phosphor screens, a face-plate with a lower light transmittance may be applied. In this case, the light transmittance of a face-plate is still higher than that of a face-plate which is applied to a color image receiving tube comprising phosphors with no pigment coating. Thus, the decrease in emission brightness of a color image receiving tube is rather small.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A color image receiving tube comprising three color (red, green and blue) phosphor screens on an inner surface of a face-plate; wherein the red color phosphor screen comprises phosphor particles with red pigment coating and has a reflective brightness of not more than 60% of that of a red color phosphor screen comprising phosphor particles with no pigment coating and not less than 70% reflectance with 620 nm wavelength light; wherein the blue color phosphor screen comprises phosphor particles with blue pigment coating and has a reflective brightness of not more than 60% of that of a blue color phosphor screen comprising phosphor particles with no pigment coating and not less than 70% reflectance with 450 nm wavelength light; wherein said three color phosphor screens have a total reflective brightness of not more than 70% of that of three color phosphor screens comprising phosphor particles with no pigment coating; and wherein a difference between the percentages of the reflective brightness of the red color phosphor screen with red pigment coating and the blue color phosphor screen with blue pigment coating is ±4% or less.

2. The color image receiving tube of claim 1, wherein the phosphor particles of the red color phosphor screen are coated with at least one pigment selected from the group consisting of iron oxide red, cadmium red and chrome vermilion.

3. The color image receiving tube of claim 1, wherein the phosphor particles of the blue color phosphor screen are coated with at least one pigment selected from the group consisting of cobalt blue, ultramarine blue and cerulean blue.

4. The color image receiving tube of claim 1, wherein the green color phosphor screen comprises phosphor particles with green pigment coating and has a reflective brightness of not more than 75% of that of a green color phosphor screen comprising phosphor particles with no pigment coating and not less than 80% reflectance with 530 nm wavelength light.

5. The color image receiving tube of claim 4, wherein the phosphor particles of the red color phosphor screen are coated with a pigment at 0.12 wt. % or above coating concentration; wherein the phosphor particles of the green color phosphor screen are coated with a pigment at 0.5 wt. % or above coating concentration; and wherein the phosphor particles of the blue color phosphor screen are coated with a pigment at a 2.0 wt. % or above coating concentration.

6. The color image receiving tube of claim 4, wherein the phosphor particles of the green color phosphor screen are coated with at least one pigment selected from the group consisting of spinel green and cobalt chromite.

* * * * *